H. A. MARTIN.
CASH REGISTER.
APPLICATION FILED JUNE 7, 1913.
1,226,682.
Patented May 22, 1917.
5 SHEETS—SHEET 1.
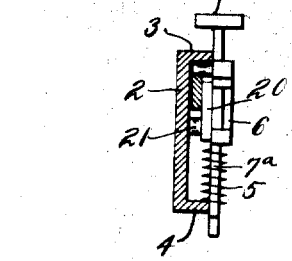
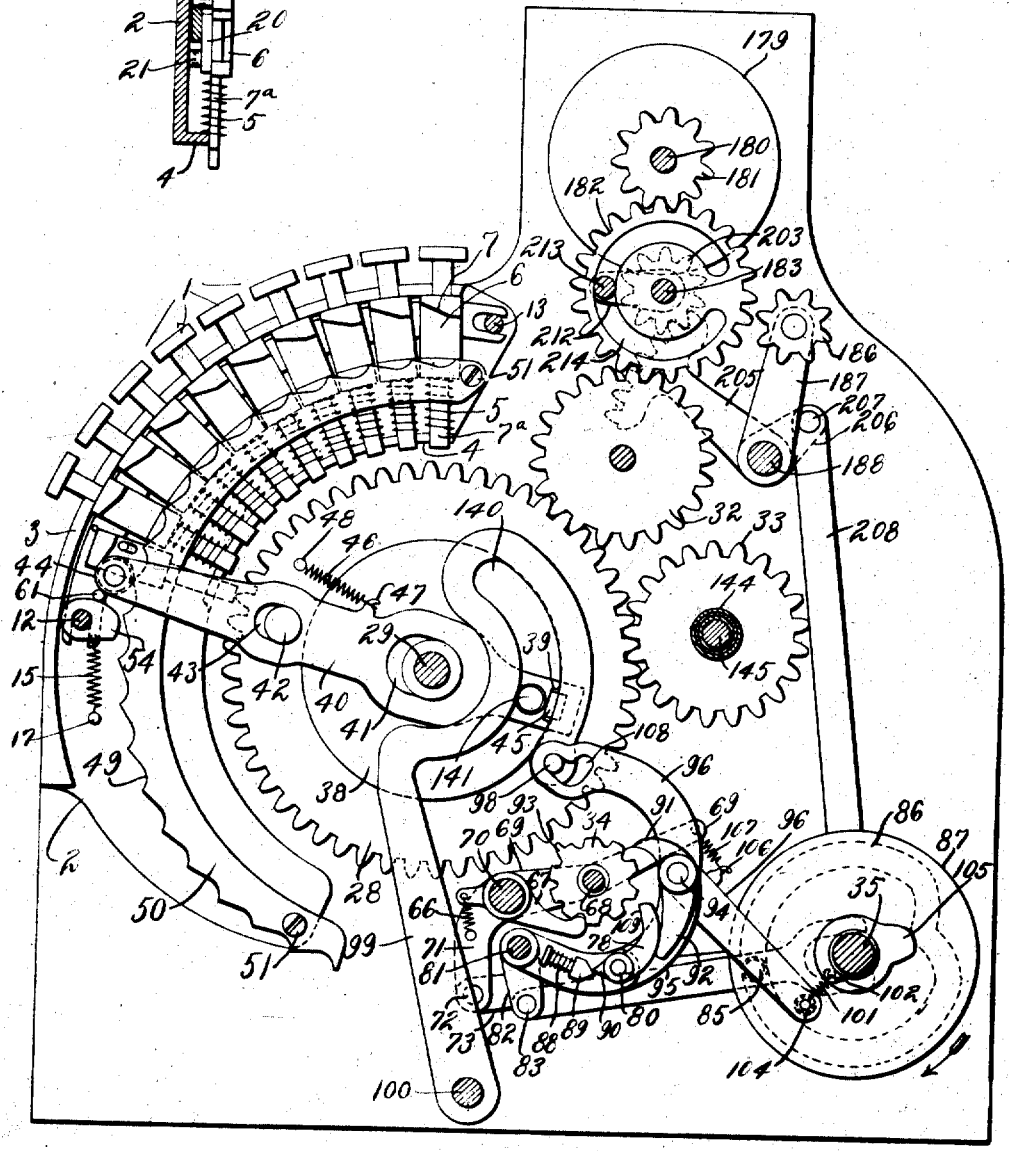
Witnesses
H. F. Sadgebury
K. W. Lindsey
Inventor
Haakon A. Martin

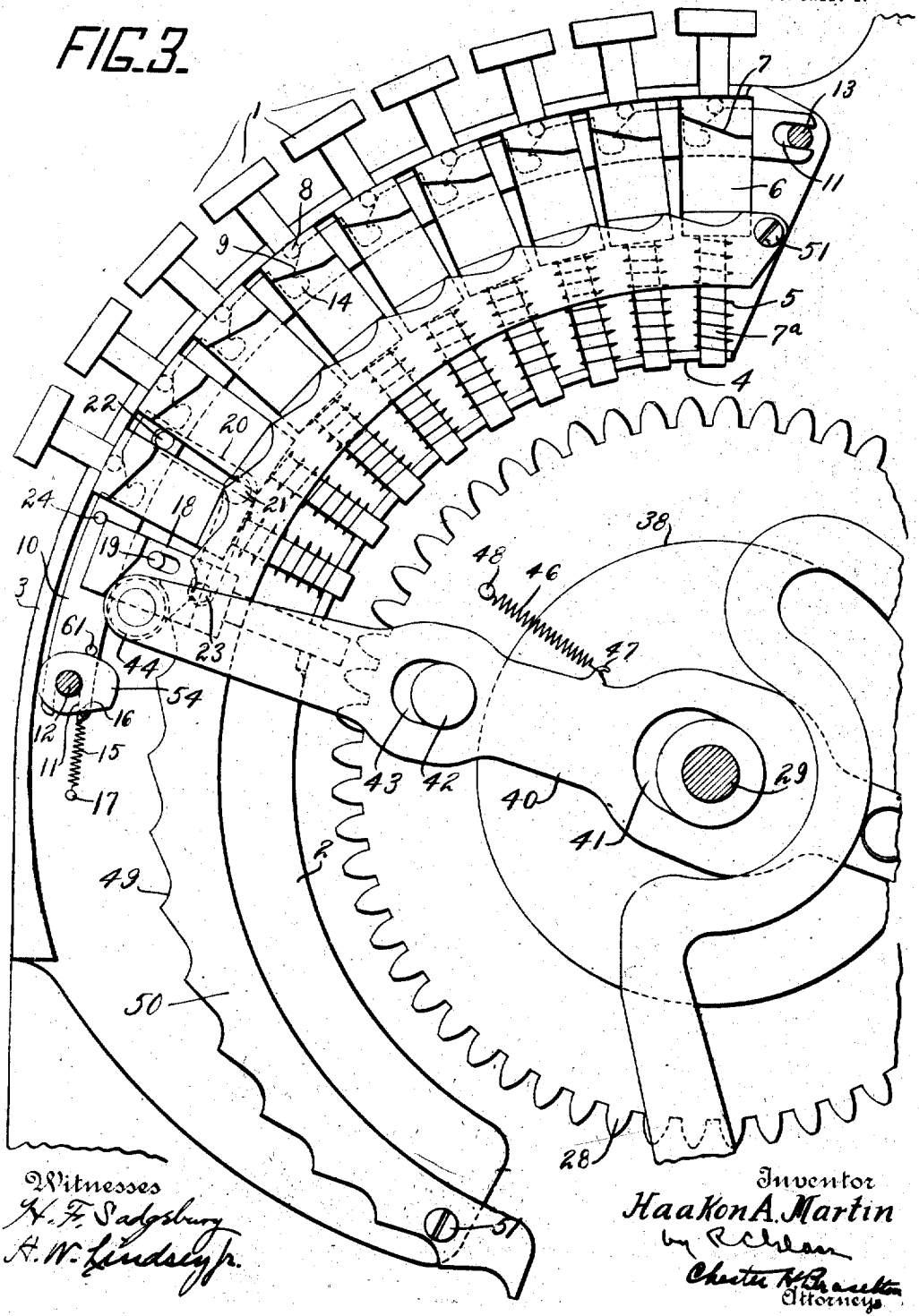

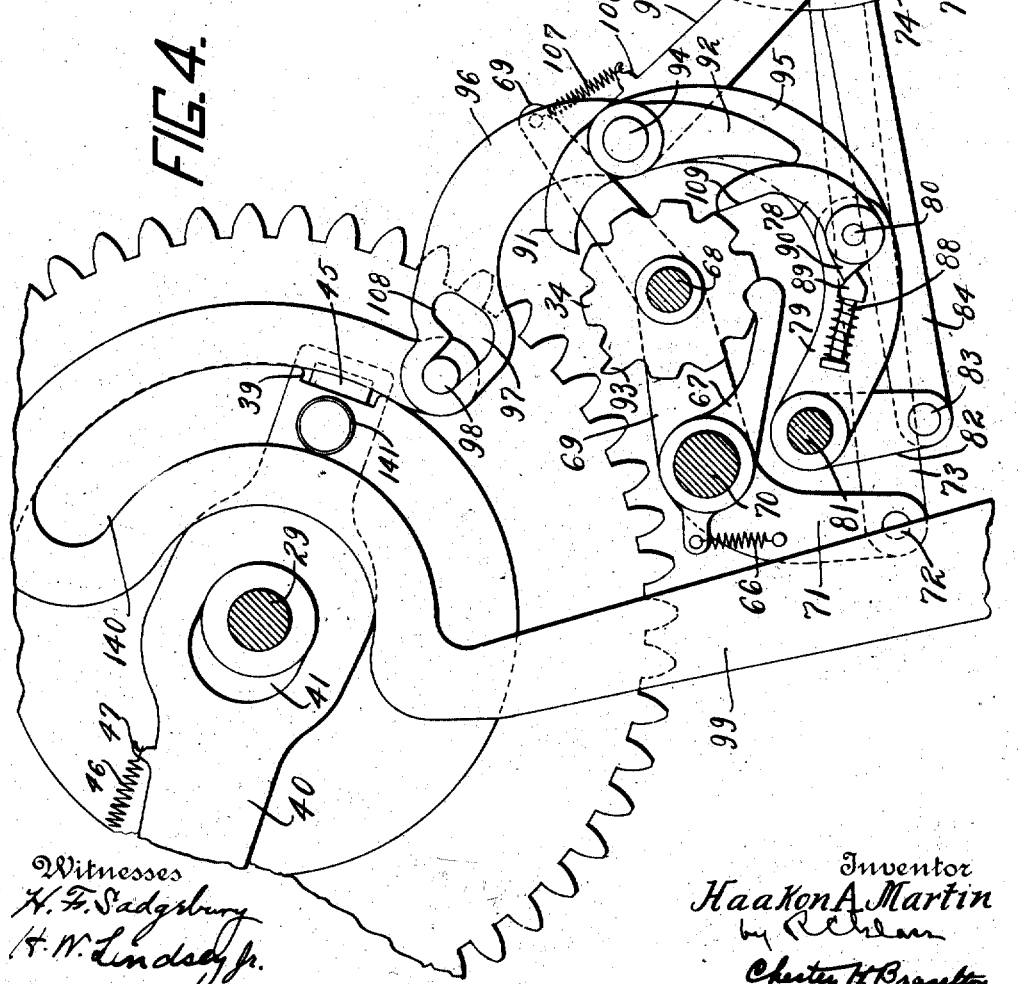

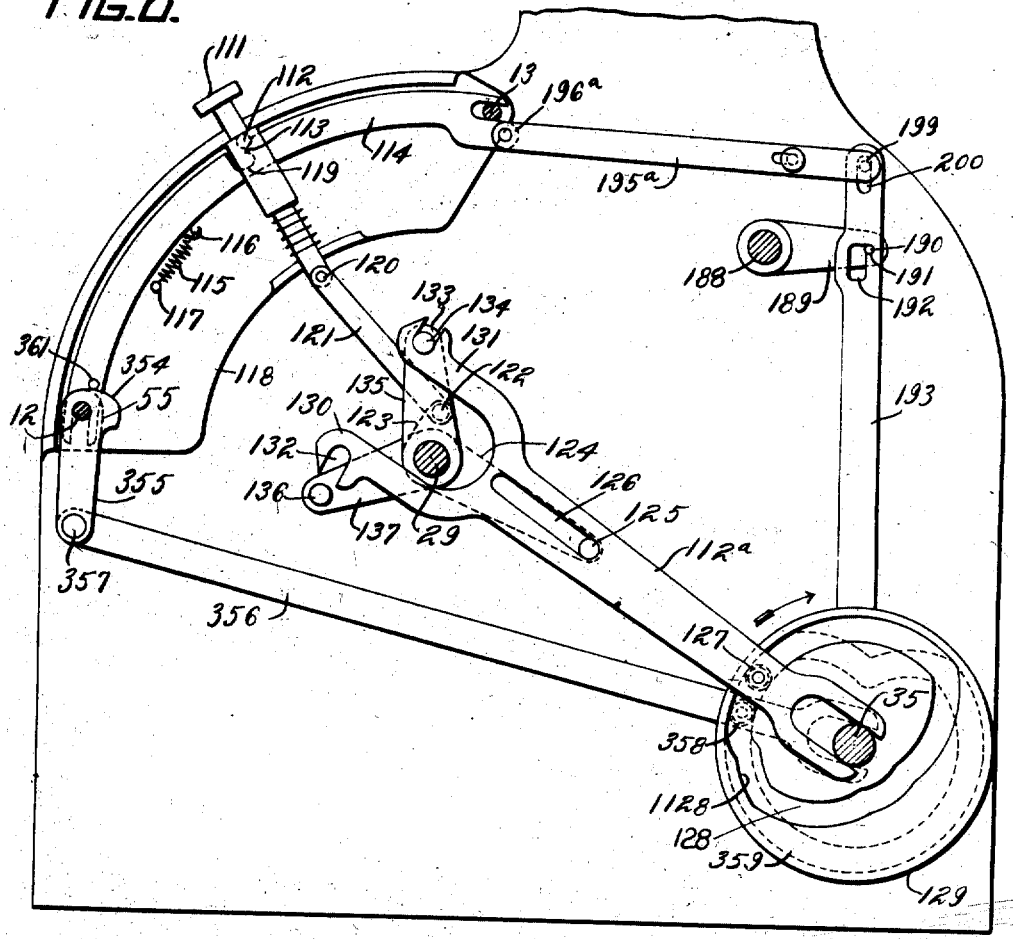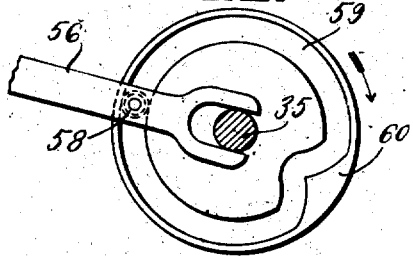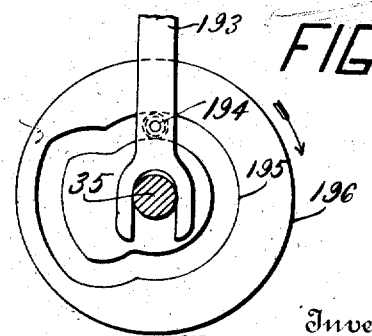

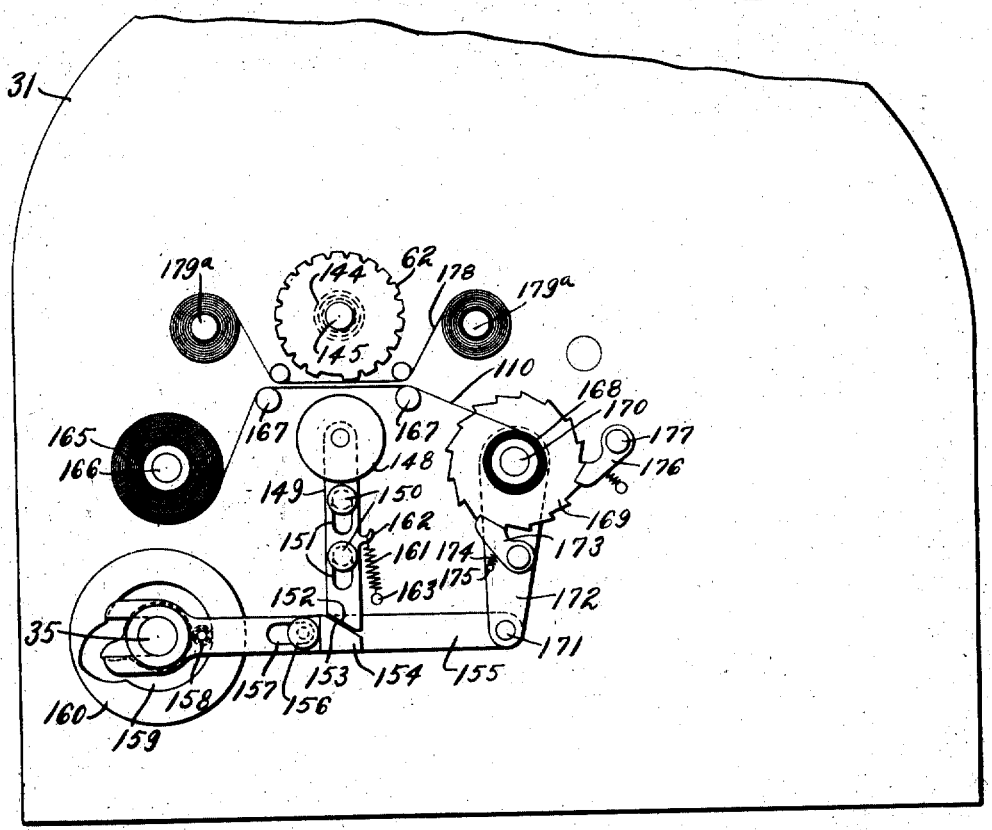
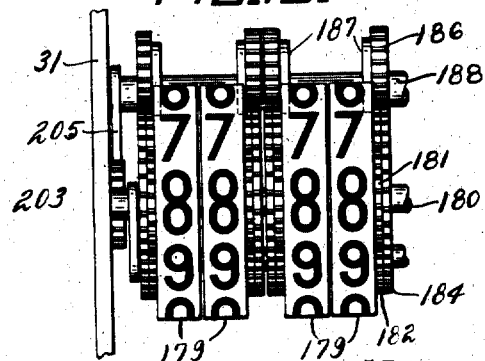

UNITED STATES PATENT OFFICE.

HAAKON A. MARTIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,226,682.   Specification of Letters Patent.   Patented May 22, 1917.

Application filed June 7, 1913. Serial No. 772,226.

*To all whom it may concern:*

Be it known that I, HAAKON A. MARTIN, a citizen of the United States, residing at Dayton, in the county of Montgomery and State of Ohio, have invented certain new and useful Improvements in Cash-Registers, of which I declare the following to be a full, clear, and exact description.

This invention relates generally to accounting machines and the particular embodiment shown and described to that class known as cash registers, which employ indicators for indicating the items entered in the accounting mechanism and printing mechanism for recording the items and the totals thereof.

One of the objects of this invention is to obtain a better form of key controlled differential mechanism, which subjects the mechanism of the machine to less jars than the known forms and the operation of which is much smoother in action. In the illustrative form of the invention shown herein this is accomplished by providing adjacent each bank of amount keys a disk having an oscillatory movement of invariable extent at every adding operation and adapted to drive differentially a gear employed to actuate the corresponding units of the accounting, printing and indicating mechanisms. The extent of movement of the actuating gear is limited by the engagement of a roller on a latch plate carried by the gear and normally connecting the disk and the gear together, with a cam edge on the key depressed, which thus serves to operate the latch plate and render it ineffective as a connecting member between the disk and the gear. The disk continues its movement uninterrupted and upon its return movement the latch again couples the disk and the gear together and causes the latter to be restored to normal position with the disk.

It is a further object of this invention to have a coöperative relationship established between the totalizer and differential mechanism by the same means and at the same time in a turn to zero operation as in an adding operation. In the preferred form of the invention embodied herein this end is obtained by always throwing the totalizer into mesh with the actuators at the beginning of the operation of the machine and moving the differential mechanism to either side of normal position without changing the direction of movement of the main driving mechanism. This permits of accumulating on the totalizer the several amounts indicated by the indicators and printed by the printing mechanism, when moved in one direction, and of turning the totalizer to zero and printing the totals originally on the totalizer on record material when rotated in the reverse direction. To this end a special "total" key is provided which, when depressed, renders ineffective to drive the differential mechanism in an adding direction, connections between the main drive shaft and the shaft carrying the driving disks, and renders the connections effective to drive the differential mechanism in a reverse direction for turn to zero operations.

Another object of the invention is to construct the totalizer and the transfer mechanism to effect a transfer when required during an adding operation of the machine, and to control the differential movement of the differential mechanism in turn to zero or total taking operations. The totalizer includes a plurality of totalizer pinions, one adjacent each actuating gear, and carried by a bell crank lever adapted to be oscillated at all operations of the machine to throw the pinions into mesh with the corresponding actuating gear. The transfer mechanism includes transfer pawls mounted on bell crank levers oscillated successively at each operation of the machine from a series of cams. The pawls on these levers are adapted to be moved into tripped position to subsequently effect transfers, by levers mounted on arms secured to a pivotal plate with a circular recess into which a roller projecting from the latch plate connecting the driving disk and the differential actuating gear, passes. These levers are moved to trip the transfer pawls by long teeth on the totalizer pinions as the latter pass from nine to zero position. As the totalizer pinions are rotated backwardly in a total taking operation the long tooth on each pinion abuts against the end of its corresponding lever adapted to trip the transfer pawls, and the latch plate is operated and disconnected from the driving disk through movement of the arm supporting the trip lever and the pivoted plate connected thereto.

To provide a novel indicating mechanism is also an object of this invention so that the indicators can be turned to zero at every operation of the machine and before the differential mechanism is rendered effective to drive them. The form of mechanism herein shown is highly adapted for use in the particular machine disclosed but it is to be understood that the form is illustrative only as the invention is susceptible of embodiment in other forms. The construction used employs two adjacent and similar pinions, loosely mounted on a shaft, one of the pinions is continuously in mesh with a pinion actuated by the differential gear and the other is continuously in mesh with the pinion integral with the indicator wheels. Rigid on the shaft supporting these pinions are arms carrying at their outer ends a horizontal bar passing through slots in all the adjacent pinions and concentric with the shaft supporting these pinions. A third pinion fast upon the shaft meshes with a segmental rack actuated at the beginning of each operation of the machine, and before the differential mechanism is actuated to set the indicators to zero position by a cam on the main drive shaft. A pinion actuated by the main operating mechanism is provided to couple the adjacent pinions together so that they may move in unison upon movement of the differential mechanism for all adding operations of the machine.

It was a further object of the machine to provide means whereby the indicator does not indicate upon a turn to zero operation of the machine the total which stood on the totalizer at the beginning of the operation.

One of the means by which this object is effected is disclosed herein and comprises mechanism for rendering the coupling pinion, positioned to be thrown into engagement with the pinion meshing with a pinion integral with the indicator and the pinion meshing with the actuating gear, inoperative during a total taking operation. This mechanism includes a detent which is actuated by the operation of a total key and employed to render the connections between the coupling pinion and the main driving mechanism ineffective upon the depression of the key.

With these and incidental objects in view, the invention consists in certain novel features of construction and combinations of parts the essential elements of which are set forth in appended claims, and a preferred form of embodiment of which is hereinafter described with reference to the drawings which accompany and form part of this specification.

Of said drawings:—

Figure 1 is a transverse vertical section of a cash register constructed according to this invention showing corresponding units of the differential, indicating, totalizer, and transfer mechanisms.

Fig. 2 is a section of a bank of amount keys taken at the position between the second and third amount keys from the bottom and looking in the direction of the bottom amount key.

Fig. 3 is an enlarged detail view of one of the banks of amount keys and part of the differential mechanism controlled thereby.

Fig. 4 is an enlarged view showing sections of the totalizer, transfer and turn to zero mechanisms and the coöperating actuator for the totalizer element.

Figs. 5, 6, and 7 illustrate respectively the indicator restoring cam, a cam controlling the key release, and a cam controlling the coupling of the indicator mechanism with the differential mechanism.

Fig. 8 is a transverse vertical section of the machine taken along the total key showing the mechanism by which the key controls turn to zero operations of the machine.

Fig. 9 is a side elevation of the printing mechanism.

Fig. 10 is a top plan of the indicator mechanism.

Keyboard.

As usual in this class of machine there are nine amount keys provided for each bank, the keys in each bank (Fig. 1) being mounted in the upper half of a circular frame 2 and slidable in ways cut in the flanges 3 and 4 projecting from the frame 2 at its outer and inner periphery. The keys are normally elevated by springs 5 engaging beneath the cam plates 6 integral with the key shanks 7ª and above the flange 4. Each key on its left side is provided with a pin 8 (Fig. 3) normally in position to engage an inclined edge 9 of a key locking detent 10 when a key is depressed. The detent 10 is provided at both ends with elongated notches 11 through which pass the shaft 12 and tie bar 13 extending laterally through the machine and supporting the frames 2. Upon depression of a key its pin 8, by engaging the inclined edge 9 of the detent 10, lifts the latter to permit full depression of the key. The key is retained in its depressed position during the operation of the machine by the detent 10 which for this purpose is provided with notches 14 at the lower ends of the inclined edges 9 so that when the pins on the keys are opposite these notches a spring 15 connecting a pin 16 on the detent and a pin 17 on the frame 2 returns the detent to engage the notch 14 with the pin 8 on the depressed key.

In addition to the usual amount keys a zero stop 18 is provided in each bank as with the particular differential mechanism employed herein it is necessary to prevent the driving mechanism from imparting a movement to the differential actuating mechanism when none of the amount keys in the bank are depressed. The construction of this stop 18 is nearly identical to that of the amount keys 1 except that the number carrying top is omitted, and it is provided with a slot 19 through which a guide pin passes. When an amount key is depressed it is desirable to render the zero stop 18 inoperative and to effect this one end of a bell crank lever 20, (Figs. 2 and 3), centrally pivoted at 21 to the frame 2, is pivotally connected by a pin 22 to the detent 10, the other end of the bell crank lever 20 being pivoted at 23 to the zero stop 18. The depression of an amount key by lifting the detent 10 carries the pin 24 projecting from the detent and positively retaining the zero stop in its normal position, out of operative relation with the forward end of the stop and rocks the bell crank lever 20 clockwise, thus lifting the zero stop 18 outward from the operative position shown in Fig. 3. Carried on the right hand side of the shank of each amount key and zero stop, is the plate 6 having a cam edge 7 which, when an amount key is depressed, or the zero stop retained in its operative position, is in operative position to control the differential mechanism.

Differential mechanism.

The differential mechanism comprises a plurality of gears 28 loosely mounted on a shaft 29 supported in bearings on the side frames 30 and 31 of the machine. One gear is provided for each denominational bank of keys up to the full capacity of the machine. Each of the gears meshes with a corresponding gear 32 by which its differential movement may be communicated to the indicator setting mechanism and with the pinion 33 through which type carriers are positioned and, it also actuates corresponding denominational pinions 34 of the totalizer when they are rocked into mesh with it. The indicating, printing and totalizing mechanism will be hereinafter fully described.

The driving mechanism of the machine includes a drive shaft 35 which is suitably mounted in bearings on the side frames 30 and 31 of the machine and given in any desired manner at each operation of the machine one complete rotation clockwise as viewed in the drawings. The shaft 29, which is oscillated about 75 degrees in a clockwise direction by the main drive shaft 35 through connections intermediate it and the main drive shaft for an adding operation, is also capable of being oscillated a like extent of movement in the opposite direction through these connections in a manner to be hereinafter explained for a total taking operation. Fast upon the rock shaft 29 and at the side of the actuating gears 28 are disks 38 each of which has a notch 39 in the rear portion of its periphery. A latch plate 40, parallel to and adjacent a side of the disk 38 has a slot 41 through which the shaft 29 passes. The latch is connected to the gear 28 by the engagement of a pin 42 on the gear 28 with the slot 43 in the latch 40 the latch being thereby allowed movement radial to the gear 28 and the disk 38. The latch carries at its forward end an anti-friction roller 44 normally in engagement with the lower end of the cam edge 7 on the plate 6 on the zero stop 18, and at its rearward end has a laterally and forwardly projecting lug 45 normally resting in the notch 39 in the periphery of the disk 38. A tensioned spring 46 connected at one end to the hook 47 on the latch and at the other to a pin 48 projecting from the adjacent gear 28 holds the latch in its normal position. In an adding operation of the machine, when no key is depressed the latch 40, upon the first one-half unit of movement of the disk 38 is forced rearward against the action of the spring 46, as the roller 44 rides forward on the cam edge 7 of the plate 6 on the zero stop and this inner movement of the latch is sufficient for the lug 45 to clear the notch 39 in which it is normally located and permits continued movement of the driving disk 38 in a clockwise direction independent of the actuator 28. The actuator is brought to rest and held in such position as the roller 44 on the latch is firmly retained between the cam edge 7 and the curved recess 49, which is opposite the zero stop 18 and in the periphery of a circular plate concentric with the rock shaft 29 and mounted on the key bank frame 2 by screws 51.

The depression of a key carries the zero stop out of operative position, as has been heretofore explained, and the actuating gear 28 is driven upward more or less by the driving disk 38 before it is stopped by the engagement of the roller 44 with the edge 7 of the cam plate 6 of the depressed key, the cam edge having been moved into the path of the roller by the depression of the key, and the roller being thereby firmly retained between the cam edge and a recess 49 opposite the key in the curved plate 50. In this way any desired differential movement is imparted to the actuating gears 28 by driving mechanism which has a constant movement. The normal position of the roller 44 on the latch 40 is one-half unit of movement below the center of the zero stop 18 and accordingly the disk 38 gives the actuating gears 28 one-half unit of movement before the latch plate 40 is given an inner movement to disconnect it from the disk 38. Provision is made in the indicating, accounting, and recording mechanism whereby these mechanisms are unaffected by this idle movement of the differential actuators 38, as will be hereinafter explained.

After the driving disks 38 have completed their movement in a clockwise direction and before they begin their return movement the keys are released and when the notches 39 on the driving disks upon their return movement are again opposite the lugs 45 on the latches 40, the latches through the springs 46 will be pulled forward and the disk with the actuating gear returned to zero position as a unit. The amount keys are released as the driving disks 38 complete their excursion of movement in a clockwise direction. To this end open cams 54 beside the detents and rigidly mounted on the shaft 12 supporting the lower ends of the detents are provided. A single arm 55 (Fig. 8), fast to one end of this shaft 12, is pivotally connected at its lower end to a pitman 56 (Fig. 6) which cannot be seen in Fig. 8 as it is similar to and immediately to the left of a pitman 356. The pitman 56 at its rear end is forked and straddles the main drive shaft 35 and carries an anti-friction roller 58 (Fig. 6), riding in a cam groove 59 in the face of a disk 60 rigidly mounted on the main drive shaft 35. The configuration of this groove is such that upon every rotation of the main drive shaft and before the driving disks 38 begin their return movement, the pitman 56 is given a rearward movement in the direction of its length, and the open cams 54, rigid on the shaft 12 and therefore with the arm 55, are rocked in a counter-clockwise direction engaging pins 61 projecting laterally from the lower end of the detents 10. The latter are thereby raised sufficiently to move the notches 14 in the inclined edge 9 out of engagement with the pins 8 on the depressed keys to permit the keys to be restored to normal position by the springs 5 coiled about their shanks. By this construction restoration of the depressed keys is provided for prior to the picking up of the actuating gears 28 by the driving disks 38 for returning the former into position for the next operation.

*Counter and transfer mechanisms.*

The totalizer comprises a plurality of counter pinions, one adjacent each bank of keys, and loosely mounted on a shaft 68 supported by the arms 69 rigid with a shaft 70 extending laterally through the machine. At the left hand end of the shaft 70 and rigid therewith is an arm 71 which at its lower end, is pivoted at 72 to a pitman 73, (Fig. 4). This pitman is bifurcated at the other end and straddles the main drive shaft 35 and also has an anti-friction roller 74 playing in a cam groove 75 in the face of a disk 76 fast to the drive shaft 35. The cam groove is so shaped as to rock the totalizer pinions into mesh with the actuating gears 28 through the arm 71 and the pitman 73 after the actuating gears have moved one-half unit of movement from normal position in order that the totalizer elements may not be actuated by the gears 28 until after the gears have been given their one-half unit of idle movement. The pawls 67, the rear ends of which are held in engagement with the totalizer pinions 34 by the springs 66 connecting the forward end of the pawls and the arm 71, are employed to aline the pinions in their various positions. As the main drive shaft 35 is always rotated in a clockwise direction it is evident that the totalizer pinions are thrown into operative relation with the actuating gears upon the movement of the actuating gears from normal position upon every operation of the machine.

The counter transfer pawl 78 is pivoted on the rearward end of an arm 79 by the pin 80, the arm being loosely mounted on the shaft 81 extending longitudinally through the machine and supported by the side frames 30 and 31 of the machine. Extending downwardly and rigid with the arm 79 is an arm 82 pivoted at 83 to a pitman 84 (Fig. 1) which, at its rear end, is forked over the main drive shaft 35 and carries an anti-friction roller 85 playing in a cam groove 86 in the face of a disk 87. The arm 79 carries a spring pressed plunger 88, the upper inclined edge 89 of which is normally in engagement with the lower inclined edge of a nose 90 of the transfer pawl 78 and the transfer pawl is thereby normally held out of operative position to effect a transfer (Figs. 1 and 4). The upwardly extending nose 91 of the trip pawl 92, normally in engagement with the rear edge of the transfer pawl 78, is adjacent the totalizer pinion of next lower denomination and is normally in the path of a long tooth 93 on the totalizer pinion. As the pinion passes from its nine to its zero position, the long tooth by its engagement with the corresponding trip pawl rocks the transfer pawl 78 into transferring position. This trip pawl 92 is supported by the stub shaft 94 carried at the upper end of an arm 95 loosely mounted on the shaft 81. A lever 96 is also pivoted to the arm 95 by the stub shaft 94 and at its forward end carries a right angled slot 97, the upper part of which is normally in contact with a pin 98 projecting from the extreme end of an irregularly shaped plate 99 pivoted to the shaft 100 supported by the side frames 30 and 31 of the machine. To the lower end of the lever is connected one end of a spring 101 which, at its other end, is secured to a hook 102 mounted on a sleeve 103 surrounding the main drive shaft 35. The lower end of the lever also carries an anti-friction roller 104 with which an open cam 105, rigidly mounted on the main drive shaft 35 engages once upon each rotation of the drive shaft. Intermediate the ends of this lever 96 and projecting from the rear edge is a hook 106 to which one end of a spring 107 is connected the other end of which connects with the arm 69 supporting the shaft 68 carrying the totalizer pinions 34.

When the machine is operated to enter an item on the totalizer the totalizer pinions 34 are rocked into mesh with their corresponding actuating gears 28 after the latter have been moved one-half step to their zero positions and while the dwell portion 112ᵃ of the cam groove 128 is in coöperation with the roller 127 on the pitman 112ᵃ which drives the shaft 29 at the beginning of the operation of the machine and such engagement is maintained during the clockwise movement of the gears but after the gears have come to rest and before they begin their return movement the totalizers are rocked out of engagement with the gears. When the totalizer is so rocked into mesh, the lever 96 and the arm 95 and therefore the trip pawl 92, being carried by the arm 95 are rocked about the shaft 81 as a pivotal center the lever 96 being connected to the arm 69, supporting the totalizers, by the spring 107. When the long tooth 93, the totalizer being now rotated in a counter-clockwise direction, engages the lower face of the nose 91 of the trip pawl 92, the transfer pawl 78 is rocked about its pivotal center 80 and as the plunger 88 passes out of operative relationship with the lower edge of the nose 90 of the transfer pawl its lower edge engages the upper edge of the nose and holds the transfer pawl 78 in transferring position. When the totalizer is thrown into mesh with the actuating gears the lever 96 is rocked about the stub shaft 94 through the spring 101 and the pin 98 enters into operative relationship with the set off 108 of the slot 97. The open cam 105 is so timed that when the totalizers are to be restored to normal position, it engages the roller 104 on the lower end of the lever 96 and rocks the lever so that the set off 108 is taken out of engagement with the pin 98 permitting the totalizers to be rocked out of engagement with the actuating gears without affecting the pivoted plate 99. After the amount has been accumulated on the totalizer and it has been rocked back to normal position through the cam groove 75 in the disk 76, the transfer pawl 78 is actuated for transferring purposes by the cam groove 86 in the disk 87 through the pitman 84 and the arms 82 and 79 as the forward end of this pawl after it has been tripped, engages the teeth on the totalizer pinions. As the pinion is moved this additional step the tooth on the totalizer pinion next to the tooth engaged by the transfer pawl engages the upper end of the forward edge 109 of the transfer pawl rocking the pawl in a counter-clockwise direction and thereby causing the plunger 88 to engage the lower edge of the nose 90 of the trip pawl 78 so that the transfer pawl is rendered inoperative for transfer operations until the pawl is again tripped. It is understood of course that there is one cam 76 for each transfer pawl and that these cams are so designed as to rock the transfer pawls successively.

*Turn to zero mechanism.*

In item entering operations the actuating gears 28 are oscillated as just described first in a clockwise direction during this movement actuating the totalizer pinions 34. The machine is adapted however, to turn the counter wheels to zero position by an operation of the machine and set the type carriers 62 in correspondence with the extent of rearward movement of the counter wheels so that an impression may be taken upon a detail strip 110 to record the total on the counter at the beginning of the operation of the machine. To this end a "total" key is provided, the depression of which controls connections between the main drive shaft 35 and the rock shaft 29 so that the latter may be given an oscillation of a like extent reverse to that which it has on an adding operation.

Referring to Fig. 8 which shows this mechanism controlling the direction of oscillation of the shaft 29, 111 represents a "total" key which is next to the last bank of amount keys on the left of the machine. When the key is depressed the pin 112 projecting from the side of the key engages the inclined edge 113 in the detent 114 and slightly raises the detent. The detent is constructed similarly to those provided for the amount key banks and is raised against the action of a spring 115 connected at one end to a hook 116 integral with the detent and at the other end to a pin 117 projecting from the key bank frame 118. The detent retains the key when operated in its depressed position by the engagement of the notch 119 in the edge 113 with the pin 112 on the key.

The total key 111 at its inner end is connected by a pin 120 to a link 121 pivotally connected at its other end by a pin 122 to an arm 123, which is loosely mounted upon the rock shaft 29 but integral with an arm 124 projecting inwardly and downwardly from the shaft 29. At the outer end of this latter arm is a laterally projecting pin 125 passing into a slot 126 in the pitman 112ᵃ which is forked at its lower end and straddles the main drive shaft 35 and also carries a roller 127 playing in a cam groove 128 in the face of a disk 129 rigidly journaled to the drive shaft 35. The upper end of this pitman is yoked, the arms 130 and 131 of the yoke having notches 132 and 133 at their outer ends and at right angles to the length of the pitman. The notch 133 in the arm 131 is normally in engagement with a stud 134 projecting from the outer end of an upwardly extending arm 135 fast to the rock shaft 29. It can readily be seen that with the pitman so connected to the arm 131 rotation of the main drive shaft in a clockwise direction oscillates the arm 135 and therefore the rock shaft 29 in a clockwise direction and this is the direction in which the shaft is rocked for an adding operation. In total taking operations, however, depression of the total key 111 through the link 121 and the arms 123 and 124 shifts the pitman 112 so that the notch 133 on the arm 131 is carried out of alinement with the stud 134 and the notch 132 in the other arm 130 of the yoke on the pitman is thrown into operative relationship with a stud 136 on an arm 137 similar to the arm 135 but projecting outwardly and downwardly from the rock shaft 29 to which it is fast. When the cam disk 129 is rotated the pitman will be given a reciprocating movement of the same extent as in an adding operation and therefore the shaft 29 will be given about 75 degrees of movement in a reverse direction.

Referring to Fig. 3 it is evident that when the total key is depressed the operation of the machine oscillates the driving disk 38 fast upon the shaft 29, in a counter-clockwise direction. The roller 44 on the latch 40, normally connecting the driving disk 38 and the actuating gear 28 is normally intermediate its zero positions that is the positions at which operation of the latch would not effect the accounting mechanism, the zero position in a turn to zero operation being at the first curved recess 49 in the circular plate 50 adjacent to and below the curved recess with which the zero stop 18 cooperates to retain the latch plate in its zero position in an adding operation when no amount key is depressed in the bank. The totalizer is not engaged by the actuating gears 28 until after the first one-half unit of movement of the driving mechanism and consequently this idle movement of the gears does not result in rotation of the totalizer pinions.

Rotation of the actuating gears 28 after the totalizer pinions 34 have been thrown in engagement with them by the cam 75 effects through counter clockwise movement of the actuators clockwise movement of the counter pinions. This reverse movement of each totalizer pinion is adapted to be stopped, when the latter has passed one step or unit beyond its zero position, by the engagement of the long tooth 93 on the pinion against the end of the nose 91 of the transfer tripping pawl 92. The long tooth on the pinion engages the trip pawl 91 when it reaches zero but one more step or unit of movement of the pinion is required to bodily rock the lever 96 and the arms 95 about the shaft 81 as a pivotal center, this lever and arm being supported by the totalizer frame by the spring 107. The plate 99 pivoted upon the shaft 100 at its lower end has a circular recess 140 concentric with the rock shaft 29 and in the path of a roller 141 projecting laterally from the rear end of the latch 40. When a totalizer pinion is moved one step beyond its zero position and the lever 96 lowered, as just explained, the plate 99 because of the engagement of the pin 98 with the set off 108 of the slot 97, is carried rearward about the shaft 100. The lug 45 on the latch 40 is thereby taken out of operative relationship with the notch 39 in the periphery of the driving disk 38 as the latch is given an inner movement through the engagement with the forward wall of the recess 140 with the latch roller 141. The driving disk 38 is then permitted to continue its invariable extent of movement in a counter-clockwise direction and at the end of its return movement the total key is released by the engagement of the cam edge 354 of an arm 355 loose on the shaft 12, with a pin 361 on the detent 114. The arm 355 is rocked counter-clockwise after the actuators have returned home to raise the detent, by the cam groove 359 which is formed in the right hand face of the disk 129 and into which a roller 358 on the pitman 356 plays, the pitman being connected at its forward end to the arm 355 by the pin 357. The totalizer is rocked out of engagement with the gears to normal position, as in the adding operation, as the cam disk 76 which controls the time of engagement of the totalizer, is rigid with the shaft 35 and therefore has the same direction of movement in both the adding and turn to zero operations. When the totalizer is rocked out of engagement each pinion is turned counter-clockwise one step to zero position as the long tooth is in engagement with the trip pawl 91 which with the lever 96 has been previously lowered when the tooth passes beyond its zero position. It is clear that the totalizer pinions and therefore the actuating gears have moved one step farther in a turn to zero operation than they were turned during the accumulation of items. The printing mechanism is constructed to provide for this extra unit of movement as will be presently explained.

*Printing mechanism.*

As has been stated, type wheels 62 for the printing mechanism shown in Fig. 9 are adapted to be differentially rotated by movement of the actuating gears 28 as the pinions 33 which are provided with twenty one teeth are mounted respectively on nested sleeves 144 supported by the shaft 145 and are continually in mesh with the actuating gears, the type wheel 62 being mounted on the outer end of these sleeves. Each of these type wheels is provided with two series of types, one series being consecutively arranged going upward from the printing line, from "0" to "9". A blank of one type space is normally one-half unit of movement to the left (Fig. 9) of the printing line and between this line and the "0" of this series. This series is employed to record totals in turn to zero operations as the actuators are rotated in a counter-clockwise direction and the blank space is provided as it will be recalled that the actuators are moved one extra step as the totalizer pinions move one step beyond zero position. The type of the other series are arranged in the same order beginning with "0" to the right of the blank space of the other series and one half-unit to the right of the printing line (Fig. 9) the characters then running upwardly from "1" to "9", and this series is employed to record the items in adding operations, the actuators in each operation being oscillated in a clockwise direction. One kind of type may be employed to record the items and another to record the totals so that the totals may be readily distinguished from the items. The zero type in one series and the blank space in the other series are positioned one-half unit of movement to either side of normal position, as it will be remembered that the actuators are given one-half unit of movement to either side of its initial position before they reach one of their zero positions.

The detail strip 110 is forced against the type 62 by a platen 148, formed of any suitable resilient material and mounted upon the upper end of a vertical bar 149 guided in its reciprocation by studs 150 projecting laterally from the side frames of the machine into slots 151 in the bar. The lower edge 152 of the bar is inclined inwardly and downwardly and is adapted to co-act with the edge 153 of a cam plate 154. This cam plate is integral with the pitman 155 which is forked over the drive shaft 35 at its rear end and suitably mounted to be reciprocated as guided by a stud 156 projecting from the frame 31 and passing into a slot 157 in the pitman. Reciprocating movement is imparted to the pitman 155 by the engagement of the roller 158 on the pitman with the cam groove 159 in the face of a disk 160 fast to the shaft 35. Forward movement of the pitman forces the platen 148 against the type carriers through the engagement of the cam plate 154 with the lower edge 152 of the platen carrying bar 149. A spring 161 connecting hook 162 integral with the platen carrying bar 149 and a stud 163 projecting from the frame 31 is provided to restore the platen to normal position after an impression has been made on the detail strip 110. The detail strip 110 passes from a supply roll 165, loosely mounted on a stub shaft 166, between the platen 148 and the type carriers 62 being so guided by the studs 167 and thence to the storage or winding roll 168. This latter roll is integral with the ratchet wheel 169 but loose upon the stub shaft 170 journaled to the frame 31 of the machine and is moved one step upon each operation of the machine. To this end the pitman 155 at its forward end is connected by a pin 171 to an arm 172 loose on the shaft 171 with the ratchet 169 on the roll 168 and this arm carries a pawl 173 held in engagement with the ratchet teeth by the compressed spring 174 between the pawl 173 and a pin 175 on the arm 172. The rotation of the cam disk 160, therefore oscillates the arm 172 causing the pawl 173 to advance the storage roller 168 one step to bring a fresh surface of the detail strip 110 in printing position at each operation of the machine. The spring pressed retaining pawl 176 mounted on the pin 177 is employed to prevent reverse movement of a ratchet wheel 169 and therefore the storage roller 168. No means are shown in the drawings for feeding the inking ribbon 178 carried by the rolls 179ª as this is not essential to the understanding of the invention and any well known method may be employed.

*Indicator mechanism.*

The indicators 179 (Figs. 1 and 10), are loosely mounted upon a shaft 180 extending longitudinally through the machine near the top and as the indicators are duplicates of each other a description of the operation of one will be sufficient. In Fig. 10 the indicators are shown as being numbered at their peripheries from "0" to "9," and as carrying at their sides pinions 181 also co-axial with the shaft 180. Each of these pinions 181 meshes with a gear 182 loosely mounted upon a shaft 183 supported by bearings in the side frames of the machine 30 and 31 and are identical to the companion gears 184 loosely mounted at their right side on the shaft 183 and meshing with the gear 32 which, in turn, meshes with the actuating gear 28. In order that an item entered on the accounting device may be set up on the indicators, coupling pinions 186 are provided each pinion being adjacent to and as wide as a corresponding pair of companion pinions 182 and 184. Each coupling pinion 186 is carried at the outer end of an arm 187 fast to the shaft 188 projecting longitudinally through the machine (Fig. 1). Projecting rearwardly (Fig. 8), from the shaft 188 and fast thereto is an arm 189 carrying at its inner end a pin 190 normally in operative relationship with a notch or set off 191 in the upper end of the rear wall of slot 192 in a pitman 193. At its lower end, the pitman is forked and straddles the main drive shaft 35 (Fig. 7), and also carries a roller 194 which rides in groove 195 in the face of the disk 196 rigidly mounted on the main drive shaft 35. The construction of this cam groove is such as to reciprocate the pitman 193 after the first one-half unit of movement of the actuating gears 28 in order to provide for the one-half unit of idle movement of the actuating gears. The coupling pinions 186 are thereby thrown into mesh during an adding operation with their corresponding pairs of pinions 182 and 184 during the movement of the actuating gears in a clockwise direction from zero position. From the above description it is apparent that the amount entered on the totalizer is set up on the indicators as rotation of the pinion 32 by the actuating gear 28 rotates the pinions 182 and 184 in unison, being coupled together, and therefore differentially rotates the indicators, the gear 182 being continuously in mesh with the pinion 181 integral with the indicator wheels.

As it is desirable to actuate the indicators only upon an adding operation and to set the indicators to zero position at each operation of the machine, the pinions 182 and 184 are only coupled together and moved in unison during the differential movement of the actuating gears 28 in an adding operation. To this end the pitman 193 is rendered ineffective for a total taking operation to oscillate the arm 187 supporting the coupling pinions as the pitman is shifted backward so that the pin 190 on the arm 189 rigid with the shaft 188 may play in the slot 192 in the pitman. This pitman is shifted rearward upon the depression of the total key by the movement of the detent 114 as the detent is connected at 196ª to a link 195ª, the other end of the link being pivoted to the upper end of the pitman 193 by the pin 199 projecting from the link and passing into the elongated slot 200 in the pitman 193.

As has been stated, it is desirable to restore the indicators to zero position at the beginning of each operation as otherwise with the particular form of actuating mechanism described the indicators would accumulate the items upon adding operations. To turn the indicators to zero the gear 182 meshing with the pinion 181 integral with the indicator is turned reversely at the beginning of each operation of the machine and independently of its associated gear 184 by the mechanism to be now described. As shown in Fig. 1 a pinion 203 is rigidly mounted on the shaft 183 supporting the gears 182 and 184 and is constantly in mesh with the teeth of a segment arm 205 loosely mounted at one end of the machine on the shaft 188 but rigid with a rearwardly projecting arm 206 pivotally connected at 207 to a pitman 208. As shown in Fig. 5, the pitman 208 is forked at its lower end over the main drive shaft 35 and carries a projecting anti-friction roller 209 riding in the groove 210 of the box cam 211 fast on the drive shaft 35. Fast to both ends of the shaft 183 are forwardly projecting arms 212 carrying at their forward ends a bar 213 which passes through circular slots 214 in all the pinions 182 and 184, the circular slots being concentric with the shaft 183. The timing of the cam groove 210 is such that during the first one-half unit of movement of the actuating gears 28 the pitman is given a short downward movement to rock the segment arm 205 in a clockwise direction. The arms 212 are oscillated by the rocking of the segment arms in the opposite direction and the bar 213 engages the ends of the circular slots in all the differentially positioned gears 182 and rotates them counter clockwise until their slots 214 coincide with those in the gears 184, these latter gears having been restored to normal position upon the return movement of the actuating gears 28 in the previous operation of the machine. The arms 212 are then rocked to normal position by the cam groove 210.

Operation.

To operate the machine for indicating and recording the amount of a transaction and entering the amount in the totalizer, all that is necessary is to depress the proper amount key and give the drive shaft 35 one complete rotation. The drive shaft 35 may be rotated either by a crank suitably geared to it or by a motor which is also common in the art. Depression of the amount keys positions their cam plates 6 in the path of the rollers 44 on the forward end of the latches 40 radial with the actuating gears 28. Rotation of the drive shaft oscillates the driving disk 38 about 75 degrees in a clockwise direction, as viewed in the drawings and each disk being connected to its adjacent actuating gear 28 by the latch 40 through the engagement of the pin 42 on the gear 28 in the slots 43 in the latch and the resting of the lug 45 on the rear end of the latch in the notch 39 in the periphery of the disk, carries the gear with it until the roller on the latch engages the cam plate 6 on the depressed amount key. Such engagement imparts to the latch a radial movement and disconnects the disk 38 from the gear 28 by the clearing of the lug 45 from the notch 39 in the disk after which the disk is allowed to continue its clockwise movement independent of the actuator. During the differential movement of the actuators just referred to the counter pinions 33 are rocked into mesh with them through the oscillation of the counter frames 69 about the shaft 70 as a pivot effected by the cam groove 75 in the disk 76 fast to the main drive shaft. After the time for the differential movement of the actuators has elapsed, the counter pinions are disengaged from the actuators and the depressed keys are released. Each actuating gear is then subsequently picked up upon the return movement of its corresponding disk and moved into position shown in the drawings for the next operation as the cam plate 6 of the depressed key has been moved out of engagement with the rollers 44 on the latch plate upon the restoration of the key to normal position the latch being then pulled forward by the spring 46 when the recess 39 in the disk comes opposite the lug 45 on the latch.

After the totalizer is disengaged from the actuators the transfer pawls 78 are successively rocked clockwise by the box cams 87 to effect the necessary transfers and the pinions restore the transfer pawls which have been tripped by the engagement of the approaching tooth on the pinion of next lower order with the nose 91 of the adjacent tripping pawl 92, to untripped position.

At the very beginning of the operation of the machine all of the indicators are restored to zero position by the oscillation of the arms 212 supporting the bar 213, caused by the cam groove 210 through the pitman 208, the arm 206, the segment rack 205, and the pinion 203. After the first one-half unit of movement of the actuators, the cam 196, through the riding of the roller 194 on the pitman 193 in the rack 195, rocks each coupling pinion 186 into mesh with its adjacent gears 182 and 184 and causing the differential movement of the actuators to be imparted to the indicators to indicate the amount of the transaction. Before the return movement of the disk 28 is begun the coupling pinions 186 are rocked out of engagement with the adjacent gears 182 and 184 and the actuators are returned to normal position without affecting the indicators.

As the pinions 33, mounted on the same sleeve 144 as are the type carriers, are continuously in mesh with the differential actuators, the movement of the actuators is imparted to the type carriers. After the time for the differential movement of the gears has elapsed and before the return movement of the actuators is to take place, the platen 184 is forced into contact with the detail strip 110 to take an impression on the detail strip from the type carriers by the reciprocation of the pitman 155 as the cam plate 154 on the pitman co-acts with the inclined edge 152 of the platen carrying bar 149. This reciprocation of the pitman 155 also feeds the detail strip one step through the oscillation of the arm 172 carrying the pawl 173 engaging with the ratchet 169 integral with the paper storage roll 168.

In operating the machine for taking a total the total key 111 only is depressed and the machine operated. This shifts the yoked pitman 112ª and the arm 131 on the pitman is taken out of engagement with the stud 134 on the arm 135 and the notch 132 on the other arm 130 of this pitman is brought into alinement with the stud 136 on the arm 137 fast to the rock shaft 29 so that when the drive shaft 35 is rotated the actuators 28 and therefore the counter pinions 33 will be driven in a reverse direction from which they were driven for an adding operation. The differential movement of the actuators 28 is then determined whenever the corresponding counter pinions 34 pass from their one to their zero position as the long teeth 93 on the pinions abut the upper ends of the noses 91 of the trip pawls 92 and thereby disconnect the latch plate 40 from the disk 38, as such engagement forces the lever 96 downward and moves the arm 99 rearward, the forward wall of the recess 140 in this arm being in engagement with the pin 141 on the latch. In this way the differential movement of the actuators in total taking operations is controlled by the movement of the counter pinions in moving reversely to zero position.

While the form of mechanism herein shown and described is admirably adapted to fulfil the objects primarily stated, it is to be understood that it is not intended to confine the invention to the one form of embodiment shown and described herein, as it is susceptible of embodiment in various forms, all coming within the scope of the claims which follow.

What is claimed is:

1. In a machine of the class described, the combination with an accounting device; of an actuator therefor capable of moving to either side of normal position; a driving member for said actuator having a movement of invariable extent to either side of normal position; and manipulative means for determining the direction of movement of said driving member.

2. In a machine of the class described, the combination with an accounting device; of an actuator therefor, capable of moving differentially to either side of normal position; a driver for said actuator; and a key having connections to determine the direction of movement of said driver.

3. In a machine of the class described, the combination with a driven member, having a normal position and capable of differential movement to but one side or the other of normal position at each operation of operating means for driving said member; of a single key for determining the direction of movement of said member.

4. In a machine of the class described, the combination with a totalizer; of differential actuators therefor having a normal position and constructed to be moved in one direction from normal position to enter items on the totalizer and in the opposite direction from normal position to turn the totalizer to zero.

5. In a machine of the class described, the combination with a driven member capable of differential movement to either side of normal position; of operating means for driving said member; connecting means intermediate said member and said operating means for controlling the direction of movement of said driven member; and a single key for controlling said connecting means.

6. In a machine of the class described, the combination with an accounting device; of a member capable of differential movement to either side of normal position to actuate the accounting device in a forward or backward direction; a main operating means for driving the same; connections intermediate said actuating member and said operating means; and a single key for controlling said connections and thereby controlling the direction of movement of said actuating member.

7. In a machine of the class described, the combination with an accounting device comprising a plurality of movable elements; of members capable of differential movement to either side of normal position to actuate the accounting elements in a forward or backward direction; a main operating means; connections intermediate said actuating member and said operating means for controlling the direction of movement of said actuating member; and a single key controlling said connections.

8. In a machine of the class described, the combination with a gear capable of differential movement to either side of normal position; of a disk capable of movements of invariable extent to either side of normal position; a latch normally connecting said gear and said disk; a main drive shaft capable of movement in but one direction for moving said disk in either direction; and means operating the latch to disconnect the gear and the disk whereby the extent of movement of the gears to either side of normal position is determined.

9. In a machine of the class described, the combination with a driven member capable of differential movement to either side of normal position; of a member for driving said driven member, and capable of movements of an invariable extent to either side of normal position; a main operating means capable of but one direction of movement; and connections intermediate said driving member and said operating means for controlling the direction of movement of said driving member.

10. In a machine of the class described, the combination with a shaft bearing two arms; of a main drive shaft capable of rotation in but one direction; a pitman normally connecting one of said arms and the main driving shaft whereby the former shaft is oscillated in one direction upon rotation of the main drive shaft; and manipulative means for connecting said other arm with said pitman for the purpose of oscillating said former shaft in a reverse direction upon the rotation of the main drive shaft.

11. In a machine of the class described, the combination with an element to be differentially positioned having a normal position; of means for differentially moving said element to but one side or the other of normal position; manipulative means arranged to control the extent of movement of said element in one direction; and an accounting device arranged to control the extent of movement of said element in the other direction.

12. In a machine of the class described, the combination with an accounting device; of actuators therefor having a normal position; type carriers controlled by said actuators for recording items entered upon the accounting device and also the totals thereof; means for driving said actuators to either side of normal position; and manipulative devices arranged to control the extent of movement of the actuators in one direction for the entering of items, the extent of movement in the other direction being controlled by the accounting device for the recording of totals.

13. In a machine of the class described, the combination with an accounting device comprising a plurality of movable elements; of actuators therefor capable of movement to either side of normal position; type carriers, connected to the actuators for recording items entered on the accounting device and also the totals thereof; a main driving mechanism; and connections between the main driving mechanism and said actuators for moving the actuators to either side of normal position, dependent on whether it is desired to add an item on the accounting device or to record the total of the items entered thereon.

14. In a machine of the class described, the combination with an accounting device comprising a plurality of movable elements; of actuators therefor having a normal position; type carriers, controlled by said actuators for recording items entered upon the accounting device and also the totals thereof; means for normally driving the actuators to one side of normal position in entering items upon the accounting device; and means for rendering said driving means capable of driving said actuators to the other side of normal position in the recording of totals.

15. In a machine of the class described, the combination with an accounting device comprising a plurality of movable elements; of actuators capable of movement to either side of normal position, for differentially moving said accounting elements on movement of said actuators from normal position; type carriers for recording items entered upon the accounting device and also the totals thereof; and means for determining the direction of movement of the actuators from normal position dependent on whether it is desired to add an item on the accounting elements or to record the total therefrom.

16. In a machine of the class described, the combination with type carriers, an accounting device, and indicators; of common actuators therefor having a normal position; and means for differentially moving said actuators to either side of said normal position whereby each item is set upon said indicators, recorded on record material, and added on said accounting device when said actuators are moved in an adding direction, and the total on said accounting device is transferred to the type carriers for printing the total of said record material when said actuators are moved from normal position in the reverse direction.

17. In a machine of the class described, the combination with type carriers and an accounting device; of differential actuators; oscillatory drivers for said actuators; manipulative devices for controlling the operation of said actuators, said accounting device also constructed to control the operation of said actuators, when backwardly rotated thereby; and means for changing the direction of oscillation of said drivers from normal position to cause backward rotation of the accounting device.

18. In a machine of the class described, the combination with a recording mechanism and an accounting device; of actuators for said mechanism and said device having a normal position; a driving member having an oscillatory movement of invariable extent for driving said actuators to either side of normal position; means whereby said driving member is normally connected to said actuators; means for rendering said connecting means inoperative upon movement of said actuators from normal position; and devices for rendering said latter means inoperative whereby said connecting means is effective to connect said driving member and said actuators upon return movement of said driving member.

19. In a machine of the class described, the combination with an accounting device comprising a plurality of movable elements; of actuators therefor capable of variable extents of movement to but one side or the other of normal position at each operation of the machine; manipulative means for determining the extent of movement of said actuators when moved to one side of normal position; means controlled by the accounting device for determining the extent of movement of the actuators to the other side of normal position; and operating means for driving said actuators.

20. In a machine of the class described, the combination with an accounting device; of actuators therefor, capable of variable extents of movement to but one side or the other of normal position at each operation of the machine; manipulative means for determining the extent of movement of said actuators when moved to one side of normal position; means controlled by said totalizer for determining the extent of movement of the actuator to the other side of normal position; and a main operating means having but one direction of movement for driving the actuators to either side of normal position.

21. In a machine of the class described, the combination with a type carrier; of a member for setting said type carrier and having a normal position; mechanism for differentially moving said member to either side of its normal position, the member being arranged to actuate said type carrier upon movement of the member to either side of normal position; manipulative devices arranged to control said member to move differentially in one direction; and an accounting device arranged to control said member to move differentially in the opposite direction.

22. In a machine of the class described, the combination with a totalizer, of item entering mechanism, total taking mechanism, indicators, means for setting the indicators by operation of the item entering mechanism, and devices for disabling said means at operations of the total taking mechanism.

23. In a machine of the class described, the combination with an accounting device comprising a plurality of movable elements; of actuators therefor adapted to rotate said elements in either direction; operating means for said actuators; indicators actuated by said actuators when said actuators rotate said accounting elements in one direction; and manipulative means for rendering said indicators incapable of operation by said actuators when said actuators rotate said accounting elements in the other direction.

24. In a machine of the class described, the combination with a totalizer, of item entering mechanism, total taking mechanism, indicators, means for setting the indicators at operations of the item entering mechanism, and devices automatically disabling said means at operations of the total taking mechanism.

25. In a machine of the class described, the combination with accounting elements, and indicators; of common actuators therefor adapted to be moved to either side of normal position; and manipulative means controlling the direction of movement of said actuators and for rendering said indicators incapable of operation by said actuators when said manipulative means is actuated.

26. In a machine of the class described, the combination with an accounting device, and indicators; of common actuators therefor; means for driving said actuators to one side of normal position to differentially operate the accounting device and set the indicators and for moving said actuators to the opposite side of normal position to restore the accounting device to zero position; and manipulative means employed to control said driving means and render the indicators inoperative by said actuators upon a turn to zero operation.

27. In a machine of the class described, the combination with an accounting device comprising a plurality of movable elements; of actuators for said accounting elements adapted to operate the same forwardly or backwardly; operating means for said actuators; indicators adapted to be operated by said actuators upon the forward movement of the accounting elements; and manipulative means for rendering the indicators inoperative by said actuators upon the backward movement of said accounting elements.

28. In a machine of the class described, the combination with indicator elements including a pinion integral therewith; of a gear meshing with said pinion; a member capable of differential movement to either side of normal position; a gear driven by said member; a coupling pinion; operating means for actuating said movable member and causing said coupling pinion to mesh with both of said gears when said actuator is moved to one side of normal position whereby said actuator differentially positions said indicator elements; and manipulative means for rendering the operating means ineffective to cause said coupling pinion to mesh with said gears when said actuator is moved to the other side of normal position whereby such movement of said actuator does not affect said indicator.

29. In a machine of the class described, the combination with an accounting wheel; of an actuator therefor adapted to rotate said wheel in either direction; operating means for said actuator; an indicator element operated by said actuator when said actuator rotates said accounting wheel in one direction; and manipulative means for rendering said indicator element incapable of operation by said actuator when said actuator rotates said wheel in the other direction and for controlling the direction of rotation of said wheel by said actuator.

30. In a machine of the class described, the combination with an accounting device; of actuators therefor; type carriers connected to said actuators for recording items entered upon the accounting device and also the totals thereof; indicators set up by said actuators when items are entered on the accounting device; and manipulative means for rendering said indicators inoperative by said actuators when totals are to be recorded.

31. In a machine of the class described, the combination with an accounting device; of actuators therefor capable of always actuating said accounting device on movement from normal position; printing mechanism for recording items entered upon the accounting device and also the totals thereof; indicators set up by said actuators when items are entered on the accounting device and recorded by the printing mechanism; and manipulative means for rendering said indicators inoperative by said actuators when totals are to be recorded.

32. In an accounting machine the combination, with type carriers; indicators; and an accounting device; of actuating means for entering items upon the accounting device, setting the items on the indicators, and actuating the type carriers to record the items as they are entered upon the accounting device and also the totals thereof; and manipulative means for determining when an item is to be entered upon the accounting device or a total recorded and for rendering the indicators incapable of operation by said actuating means when said manipulative means is operated.

33. In an accounting device the combination with differentially movable members; of indicating, accounting, and recording mechanisms controlled thereby for the purpose of indicating, accumulating, and listing items; and means controlling the indicating mechanism and differentially movable members whereby a total on the accounting device is recorded on the recording mechanism without indicating the same on the indicating mechanism.

34. In an accounting machine the combination with actuating means; of indicating, accounting and recording mechanisms controlled thereby for the purpose of indicating, accumulating and listing items; and means for rendering said actuating means, controlled by the accounting device upon the turning to zero of said device, operative to actuate the recording device for the purpose of recording the total on the accounting device, said means being also employed to render said indicating mechanism ineffective to indicate the total recorded.

35. In an accounting machine the combination with type carriers, indicators, and an accounting device; of actuating means for entering items upon the accounting device, setting up the indicators and actuating the type carriers to record the items as they are entered upon the accounting device, and also the totals thereof; a key for determining when an item is to be entered upon the accounting device or a total recorded; and a detent actuated by said key and employed to render said indicators ineffective to set up totals recorded.

36. In a machine of the class described, the combination with a recording mechanism and accounting devices; actuators therefor; means for moving the accounting device into and out of engagement with the actuators; transfer mechanism incapable of movement with the accounting device; and trip devices movable with the accounting device whereby the transfer mechanism is controlled during an adding operation and the differential movement of the actuator is determined when the machine is operated for the recording of the totals.

37. In a machine of the class described, the combination with a recording device; of accounting elements; an actuator therefor; a driving member for said actuator; a transfer mechanism including a pivoted trip pawl mounted to have both a bodily and a rocking movement, said accounting elements being constructed to engage said pawl and trip the transfer mechanism when rotated by said actuator in an adding direction and to disengage the actuator from the driving member when the element is rotated by said actuator in the reverse direction whereby the total of the element is transferred to the recording device.

38. In a machine of the class described, the combination with a printing mechanism; of an accounting device; actuators for the accounting device; mechanism including a pivoted trip pawl mounted to have both a bodily and a rocking movement, said accounting device being constructed to move said pawl in one manner when forwardly rotated and in the other manner when backwardly rotated; and connections from the pawl for controlling total printing and transferring operations by said movements.

39. In a machine of the class described, the combination with a printing mechanism; of differential mechanism connected to control the printing mechanism; a totalizer adapted to be rotated by said differential mechanism; means for driving the differential mechanism; a movable latch for connecting said driving mechanism and said differential mechanism; and a plate extending along the path of movement of said latch, said totalizer being constructed to move said plate and thereby cause the same to operate said latch.

40. In an accounting machine the combination with an accounting device; of an actuator for the accounting device; a member having a uniform movement for driving said actuator; a latch for connecting said member with the actuator; a plurality of keys each provided with a cam for controlling the operation of said latch; a movably operative zero stop similarly provided with a cam; and a connection between said keys and the zero stop whereby the latter is made inoperative on the depression of a key.

41. In a machine of the class described, the combination with an accounting device; of rotary indicators; differential mechanism for operating the accounting device and setting the indicators accordingly; means for returning the differential mechanism to normal position; and independent means for positively restoring the indicators during the operation of the machine.

42. In a machine of the class described, the combination with an accounting device; of indicators; actuators for operating the accounting device, and setting the indicators accordingly; movable members for driving the actuators; and means independent of said actuators for positively restoring the indicators to zero position before said movable members are actuated during the operation of the machine.

43. In a machine of the class described, the combination with indicators; of differential actuators for setting the indicators; and means independent of the actuators for positively restoring said indicators to zero position upon every operation of the machine.

44. In a machine of the class described, the combination with indicators; of actuators for differentially setting the same; and means independent of said actuators for positively restoring said indicators to zero position upon every operation of the machine and before said actuators are actuated.

45. In a machine of the class described, the combination with indicators; actuators for differentially setting the indicators; a shaft for driving said actuators; and connections intermediate said shaft and said indicators and independent of said actuators for positively restoring said indicators to normal position before every actuation of said actuators.

46. In a machine of the class described, the combination with indicators; of differentially movable members; gears intermediate said indicators and said actuators, for imparting to said actuators the differential movement of said movable members; slots in said gears; bars operating in said slots; and means independent of said movable members for revolving said bar before actuation of said differentially movable members whereby said indicators are restored to normal position.

47. In a machine of the class described, the combination with indicators; of differentially movable members; gears intermediate said indicators and said actuators for imparting to said indicators the differential movement of said movable members; and means independent of said differentially movable members for actuating certain of said gears to restore said indicators to zero position.

48. In a machine of the class described, the combination with an accounting device; of actuators therefor; adapted to operate the accounting device both to enter items thereon and turn the same to zero; and means for establishing at the same time in all operations of the machine a coöperative relationship between the actuators and the accounting device.

49. In a machine of the class described, the combination with an accounting device; of differential actuators adapted to operate the accounting device to both enter items thereon and turn the same to zero; operating means for establishing a coöperative relationship between the actuators and the accounting device at the same time and maintaining such relationship for the same time at all operations of the machine; and manipulative means for determining the extent of movement of the actuators when an item is entered on the accounting device said accounting device being constructed to determine the extent of movement of the actuators when the device is turned to zero.

50. In a machine of the class described, the combination with an accounting device; of actuators therefor adapted to drive the accounting device in entering items thereon and in turning the same to zero; printing mechanism for recording items entered on the accounting device and also the totals thereof; and means for establishing at the same time in every operation of the machine a coöperative relationship between the actuators and the accounting device.

51. In a machine of the class described, the combination with an accounting device; of actuators therefor adapted to drive the accounting device both in item entering and total taking operations; printing mechanism for recording items entered on the accounting device and also the totals thereof; means for establishing at the same time in every operation of the machine a coöperative relationship between the actuators and the accounting device; and manipulative means for determining the extent of movement of the actuators when an item is entered on the accounting device, said accounting device being constructed to determine the extent of movement of the actuators when a total is recorded.

52. In a machine of the class described, the combination with actuators; a plurality of totalizer elements; transfer pawls therefor; trip pawls for moving said transfer pawls into transferring position movable with the totalizer elements independent of the transfer pawls; means for moving the totalizer elements into and out of engagement with the actuators; and means independent of said last mentioned means for actuating the transfer pawls which have been moved to transferring position to effect transfers after the totalizer elements have been moved out of engagement with the actuators.

53. In a machine of the class described, the combination with a totalizer and movable frame for carrying the same; transfer elements for said totalizer; trip pawls for said transfer elements movable with said totalizer frame independent of said transfer elements and adapted to prepare the transfer elements for effecting a transfer when required; and means for actuating the transfer pawls to effect transfers.

54. In a machine of the class described, the combination with a totalizer; of a frame for supporting the same; transfer elements; pawls movable with said frame independent of said transfer elements and adapted when tripped by their corresponding totalizer wheels in passing from nine to zero position to prepare the transfer elements for effecting transfers; and means for subsequently actuating the transfer pawls to effect transfers.

55. In a machine of the class described, the combination with a totalizer; of a movable frame for supporting the same; transfer elements; pawls movable with said frame independent of said transfer elements but constantly in engagement with said transfer elements and adapted when tripped by their corresponding totalizer wheels in passing from nine to zero position to prepare the transfer elements for effecting a transfer; and means for actuating the transfer elements to effect transfers.

56. In a machine of the class described, the combination with an accounting device comprising a plurality of accounting elements; of a printing mechanism including type carriers for recording items entered on the accounting device and also the totals thereof; and actuators for simultaneously actuating the accounting elements and the type carriers accordingly in both item entering and total taking operations.

57. In a machine of the class described, the combination with an accounting device: of a printing mechanism including type carriers for recording items entered on the accounting device and also the totals thereof; and actuators having a normal position and constructed upon movement from normal to operate simultaneously the accounting device and the type carriers accordingly in both item entering and total taking operations.

58. In a machine of the class described, the combination with an accounting device; of actuators therefor adapted to enter items thereon in an adding operation and turn the same one step past zero position in a turn to zero operation; and means for subsequently moving the accounting device back one step to zero position after it has been moved by the actuators in turn to zero operations.

59. In a machine of the class described, the combination with a recording device; of accounting elements; an actuator therefor; a driven member for said actuator; and transfer mechanism including a pivoted trip pawl mounted to have both a bodily and a rocking movement, said accounting elements being constructed to engage said pawl and trip the transfer mechanism when rotated by said actuator in an adding direction and to disengage the actuator from the driving member when the element is rotated by said actuator one step past zero position in a reverse direction whereby the total on the element is transferred to the recording device.

60. In a machine of the class described, the combination with a printing mechanism; of an accounting device; actuators for the accounting device; transfer mechanism including a pivoted trip pawl mounted to have both a bodily and rocking movement said accounting device being constructed to move said pawl in one manner when forwardly rotated and in the other manner when moved one step past zero position upon being backwardly rotated; and connections from said pawl for controlling total printing and transferring operations by said movements.

61. In a machine of the class described, the combination with an accounting device; of means for entering items on the accounting device and turning the same to zero; and a printing mechanism including type carriers having two series of types and constructed to be turned in one direction so that items entered on the accounting device may be recorded from one series of type and in the other direction so that the total of the accounting device may be recorded from the other series of type.

62. In a machine of the class described, the combination with an accounting device; of actuators for entering items on the accounting device and for turning the same reversely one step past zero position; and a printing mechanism for recording items entered on the accounting device and also the total of the items when the accounting device is turned one step past zero position.

63. In a machine of the class described, the combination with an accounting device; of actuators for entering items on the accounting device and for turning the same reversely one step past zero position; and a printing mechanism including type carriers having a normal position and moved by the actuator to one side of normal position so that an item entered on the totalizer may be recorded on record material, and to the other side of normal so that the total of the items may be recorded on the record material.

64. In a machine of the class described, the combination with an accounting device; of actuators for entering items on the accounting device and for turning the same reversely one step past zero position; and a printing mechanism including type carriers having a normal position and moved to one side of normal position so that an item entered on the totalizer may be recorded on record material, and to the other side of normal so that the total of the items may be recorded on the record material.

65. In a machine of the class described, the combination with an accounting device; of means for entering items on the accounting device and for turning the same reversely one step past zero position; and a printing mechanism including type carriers having two series of type and constructed to be turned in one direction so that an item entered on the accounting device may be recorded from one series of type, and in the other direction so that the total of the items may be recorded from the other series of type, this last series being provided with a blank space for compensating for the one step of movement of the accounting device past zero position.

66. In a machine of the class described, the combination with an accounting device; of actuators therefor adapted to drive the accounting device both in item entering and total taking operations; printing mechanism including type carriers with two series of type one series being employed for recording items entered on the accounting device and the other for the recording of totals of the items; means for establishing at the same time in every operation of the machine a coöperative relationship between the actuators and the accounting device; and manipulative means for determining the extent of movement of the actuator when an item is entered on the accounting device, said accounting device being constructed to determine the extent of movement of the actuators when a total is recorded.

67. In a machine of the class described, the combination with an accounting element; of an actuator therefor; means for moving said actuator in opposite directions from a normal position; and a single latch mechanism for connecting said actuator and said means, and adapted to be tripped at different points of movement of the actuator to either side of normal position.

68. In a machine of the class described, the combination with an accounting element; of an actuator therefor; means for moving said actuator in opposite directions from a normal position, said means having a constant extent of movement to either side of normal position; and a latch normally connecting said actuator and said moving means and adapted to be tripped at different points of movement of the moving means on either side of normal position.

69. In a machine of the class described, the combination with an element to be differentially positioned having a normal position, of a member for differentially moving said element to either side of normal position, manipulative means arranged to control the extent of movement of said element in one direction, and an accounting device arranged to control extent of movement of said element in the other direction.

70. In a machine of the class described, the combination with a totalizer, of actuators constructed to operate said totalizer both to add and to clear the totalizer, means for operating the actuators, and means invariably engaging the totalizer with the actuators as a preliminary to operation of the actuators.

71. In a machine of the class described, the combination with a totalizer, of actuators constructed to operate said totalizer in one direction to add and in the opposite direction to clear the totalizer, means for engaging the totalizer with the actuators at the same point in every operation, and manipulatively controlled means for operating the actuators.

72. In a machine of the class described, the combination with a main driving device, of a totalizer, a set of actuators, devices invariably engaging the totalizers with the actuators at the same point in the movement of the driving device, means for then moving the actuators in one direction to add or in the opposite direction to clear the totalizer, and manipulative devices controlling said means.

In testimony whereof I affix my signature in the presence of two witnesses.

HAAKON A. MARTIN.

Witnesses:
R. C. GLASS,
CARL BEUST.